United States Patent
Ugale et al.

(10) Patent No.: US 11,204,872 B2
(45) Date of Patent: Dec. 21, 2021

(54) ACHIEVING GUARANTEED APPLICATION PERFORMANCE USING TRANSACTIONAL I/O SCHEDULING FOR SSD STORAGE USING KNOWN READ/WRITE LATENCIES

(71) Applicant: EMC IP Holding Company LLC, Hopkinton, MA (US)

(72) Inventors: Rahul Ugale, Santa Clara, CA (US); Colin Zou, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 27 days.

(21) Appl. No.: 16/664,088

(22) Filed: Oct. 25, 2019

(65) Prior Publication Data
US 2021/0124683 A1 Apr. 29, 2021

(51) Int. Cl.
*G06F 12/0855* (2016.01)
*G06F 12/0842* (2016.01)

(52) U.S. Cl.
CPC ...... *G06F 12/0855* (2013.01); *G06F 12/0842* (2013.01); *G06F 2212/1024* (2013.01)

(58) Field of Classification Search
CPC ............ G06F 12/0855; G06F 12/0842; G06F 2003/0697; G06F 3/0611; G06F 3/0613; G06F 3/0655; G06F 3/067; G06F 3/0659; G06F 2212/1024
See application file for complete search history.

(56) References Cited

U.S. PATENT DOCUMENTS

| | | | | |
|---|---|---|---|---|
| 9,971,529 | B1* | 5/2018 | LeCrone | G06F 3/0611 |
| 10,055,420 | B1* | 8/2018 | Pogde | G06F 11/1448 |
| 2005/0065961 | A1* | 3/2005 | Aguren | G06F 16/10 |
| 2012/0066435 | A1* | 3/2012 | Colgrove | G06F 3/061 |
| | | | | 711/103 |
| 2015/0317556 | A1* | 11/2015 | Huang | H04L 67/34 |
| | | | | 706/23 |
| 2017/0242596 | A1* | 8/2017 | Liu | G06F 3/0659 |
| 2018/0032266 | A1* | 2/2018 | Yan | G06F 12/0871 |
| 2018/0260158 | A1* | 9/2018 | Marripudi | G06F 11/34 |
| 2020/0278932 | A1* | 9/2020 | Bavishi | G06F 12/0893 |
| 2020/0327102 | A1* | 10/2020 | Zhang | G06F 11/1453 |

* cited by examiner

*Primary Examiner* — Tracy A Warren
(74) *Attorney, Agent, or Firm* — Staniford Tomita LLP

(57) ABSTRACT

Embodiments are described for prioritizing input/output (I/O) operations dispatched to a solid-state device (SSD) storage in a network, determining properties of the SSD storage based on SSD device type, where the SSD storage maintains a plurality of caches, receiving a plurality of SSD I/Os from an application I/O request comprising at least one of a cache read or a cache write operation, creating a respective queue for each SSD I/O of the SSD I/Os based on a type of SSD I/O, prioritizing the each SSD I/O based on the type of the SSD I/O and the properties of the SSD storage that is the target for a respective SSD I/O, and dispatching, in a transactional I/O SSD scheduler, all queued SSD I/Os to the SSD storage based on the prioritizing.

20 Claims, 12 Drawing Sheets

500

| IO Type | Tag ID | Arrival Time | Internal Child IO | # of Child IO's |
|---|---|---|---|---|
| Backup_App_IO_1 | 0x1 | 1000 | BKUP_IDX_IO_1, BKUP_LP_IO_1, BKUP_META_IO_1, BKUP_L0_IO_1 | 4 |
| Backup_App_IO_2 | 0x2 | 1000 | BKUP_IDX_IO_2, BKUP_LP_IO_2, BKUP_META_IO_2, BKUP_L0_IO_2 | 4 |
| Backup_App_IO_3 | 0x3 | 1002 | BKUP_IDX_IO_3, BKUP_LP_IO_3, BKUP_META_IO_3, BKUP_L0_IO_3 | 4 |
| ... | ... | | ... | |
| Backup_App_IO_10 | 0xA | 1003 | BKUP_IDX_IO_A, BKUP_LP_IO_A, BKUP_META_IO_A, BKUP_L0_IO_A | 4 |
| ... | ... | | ... | |
| GC_IO_2 | 0x2 | 1000 | GC_CLNT-1_IO_2, GC_CLNT-2_IO_2 | 2 |
| GC_IO_3 | 0x3 | 1002 | GC_CLNT-1_IO_3, GC_CLNT-2_IO_3 | 2 |
| ... | ... | | | |
| GC_IO_10 | 0xA | 1003 | GC_CLNT-1_IO_A, GC_CLNT-2_IO_A | 2 |

| PRIORITY | TIME | LEVEL |
|----------|------|-------|
| P1 | T1 | C1 |
| P1 | T2 | C2 |
| P1 | T3 | C1 |
|  |  |  |
| P2 | T2 | C1 |
| P2 | T3 | C3 |
| P2 | T5 | C1 |
| P2 | T6 | C2 |

FIG. 8

| MEDIA TYPE | PROPERTY |
|------------|----------|
| SSD | 5ms |
| HDD | 20ms |
| CLOUD | 100ms |

FIG. 9A

| I/O Type | Internal Child I/O | # of Child I/O's |
|----------|--------------------|--------------------|
| Backup_App_Sequential_IO_1 | BKUP_SSD_IO_1, BKUP_SSD_IO_1, BKUP_HDD_IO_1 | 3 |
| Backup_App_Random_IO_2 | BKUP_IDX_SSD_2, BKUP_SSD_IO_2, BKUP_HDD_IO_2, BKUP_HDD_IO_2, BKUP_CLOUD_IO_2 | 5 |
| ... | ... |  |
| GC_IO_2 | GC_CLNT-1_HDD_IO_2, GC_CLNT-2_CLOUD_IO_2 | 2 |

```
┌─────────────────────────────────────────┐
│ Tag all Child I/Os initiated from a     │
│ Parent I/O with the Same Unique Tag ID  │
│ 952                                     │
└─────────────────────────────────────────┘
                    ↓
┌─────────────────────────────────────────┐
│ Track Time of Arrival of Each I/O       │
│ Operation of the Child and Parent I/O   │
│ Operation                               │
│ 954                                     │
└─────────────────────────────────────────┘
                    ↓
┌─────────────────────────────────────────┐
│ Store the Unique Tag IDs for the I/O    │
│ Operations in a Hash Table Indexed by   │
│ the Tag IDs                             │
│ 956                                     │
└─────────────────────────────────────────┘
                    ↓
┌─────────────────────────────────────────┐
│ Store Network and Device Information    │
│ for Virtual and Cloud Networks and HDD  │
│ or SDD Devices                          │
│ 958                                     │
└─────────────────────────────────────────┘
                    ↓
┌─────────────────────────────────────────┐
│ Applying QoS Requirements Defined at    │
│ the Disk Level                          │
│ 960                                     │
└─────────────────────────────────────────┘
                    ↓
┌─────────────────────────────────────────┐
│ Dispatch All Sibling I/Os of the Parent │
│ I/O Operation to the HBA based on the   │
│ Unique Tag ID, Times of Arrivals,       │
│ Network and Device Information, and     │
│ Additional QoS Requirements             │
│ 962                                     │
└─────────────────────────────────────────┘
```

| SSD IOPS Config | | |
|---|---|---|
| Model | Model-1 | Model-2 |
| SSDs | 8 | 16 |
| INDEX Read 4KB <5ms | 31000 | 66000 |
| INDEX Write 1MB <10ms | 540 | 640 |
| DM Read 64KB <2ms | 750 | 750 |
| DM Write 1MB <20ms | 20 | 20 |
| LP Read 16KB <1ms | 30000 | 60000 |
| LP Write 1MB <30ms | 140 | 280 |
| L0 Read 8KB <1ms | 30000 | 60000 |
| L0 Write 1MB <20ms | 120 | 240 |
| CMETA 64KB Read <2ms | 6000 | 12000 |
| CMETA Write 1MB <20ms | 20 | 25 |

| IO Type | SSD internal IO | # of IOs |
|---|---|---|
| Backup_App_Sequential_IO_1 | SSD_DM_READ, SSD_LP_READ, SSD_CMETA_READ, SSD_L0_READ | 4 |
| Backup_App_Random_IO_2 | SSD_DM_READ, SSD_LP_READ, SSD_CMETA_READ, SSD_LP_WRITE | 4 |
| ... | ... | |

FIG. 13

ACHIEVING GUARANTEED APPLICATION PERFORMANCE USING TRANSACTIONAL I/O SCHEDULING FOR SSD STORAGE USING KNOWN READ/WRITE LATENCIES

CROSS-REFERENCE TO RELATED APPLICATIONS

This application is related to co-pending application Ser. No. 16/670,213 entitled "Achieving Guaranteed Application Performance Using Transactional I/O Scheduling for SSD Storage by Interleaving and Splitting Read/Write I/Os With Required Latency Configurations," filed on Oct. 31, 2019, which is hereby incorporated by reference its entirety.

TECHNICAL FIELD

Embodiments are generally directed to networked-based data backup systems, and more specifically to achieving storage subsystem performance guarantees by applying transactional I/O scheduling.

BACKGROUND

Deduplication backup systems, such as the DellEMC Data Domain system use deduplication techniques as a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

To service an input/output (I/O) operation initiated from an external backup application, the Data Domain File System (DDFS) must initiate multiple internal I/O operations, such as to lookup LP segment fingerprints, look up indexes, read container metadata, and to read the actual data before servicing the I/O to the backup application. In addition to the external backup application workload there could be some internal file system maintenance operations, such as garbage collection (GC), and so on, that are concurrently executed to keep the system at an optimal state. The I/O's that are initiated as part of backup application workload as well as the internal maintenance operations would be serviced from the same storage devices.

Current systems typically have Quality of Service (QoS) parameters to throttle the internal operations (like garbage collection) and prioritize backup application workload, but such QoS parameters have certain limitations. These include limitations to a single disk, i.e., on a single disk, the I/O Scheduler which has the Quality of Service knowledge prioritizes backup application workload versus internal management operations. The QoS parameters operate at the system level and do not take advantage of identifying the underlying device type, such as fast Solid State Drive (SSD) versus traditional Hard Disk Drive (HDD) and therefore do not schedule I/O's according to these respective devices at the system level. Due to these and other disadvantages, QoS agreements are generally not optimally applied to specific backup application I/O processes.

These limitations mean that systems do not optimally apply QoS agreements to the backup application I/O since these multiple internal I/Os could be serviced from different storage devices on the system, and only having QoS knowledge per individual disk does not provide an optimal QoS to the backup application I/O. The reason for this is that there will be I/Os initiated from the backup application and also I/Os initiated from system internal operations that will interleave on the physical storage device over time, and the QoS agreement to the backup application will not be honored. The other limitation is that if some of the internal I/Os, as part of backup application I/O land on SSD and if some land on HDD, since the process does not tag all internal I/Os resulting from a backup application as a single entity, it cannot tag all internal I/Os resulting from a backup application I/O as a whole across storage subsystem, which can be useful in environments where storage is a bottleneck, such as in virtual environments.

What is needed, therefore, is a deduplication backup method and system that optimally applies QoS agreements and parameters to specific backup applications.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 5 illustrates example I/O tagging of internal sibling I/Os, under some embodiments.

FIG. 8 is a table 800 that illustrates an encoding of a tag ID incorporating class of service (Cn) for write I/Os, under some embodiments.

FIG. 9A is a table that illustrates example properties in the form of latency values for three different types of media, SSD, HDD, and Cloud, under some example embodiments.

FIG. 9B is a table that illustrates an encoding of a tag ID incorporating media performance parameters, under some embodiments.

FIG. 10 is a flowchart that illustrates an overall process of achieving storage subsystem performance guarantees using transactional I/O scheduling with media performance parameters, under some embodiments.

FIG. 12 is a table that illustrates example SSD I/O configurations, under some embodiments.

FIG. 13 is a table that illustrates example SSD I/Os to be prioritized for dispatch, under some embodiments.

DETAILED DESCRIPTION

Figure 1:
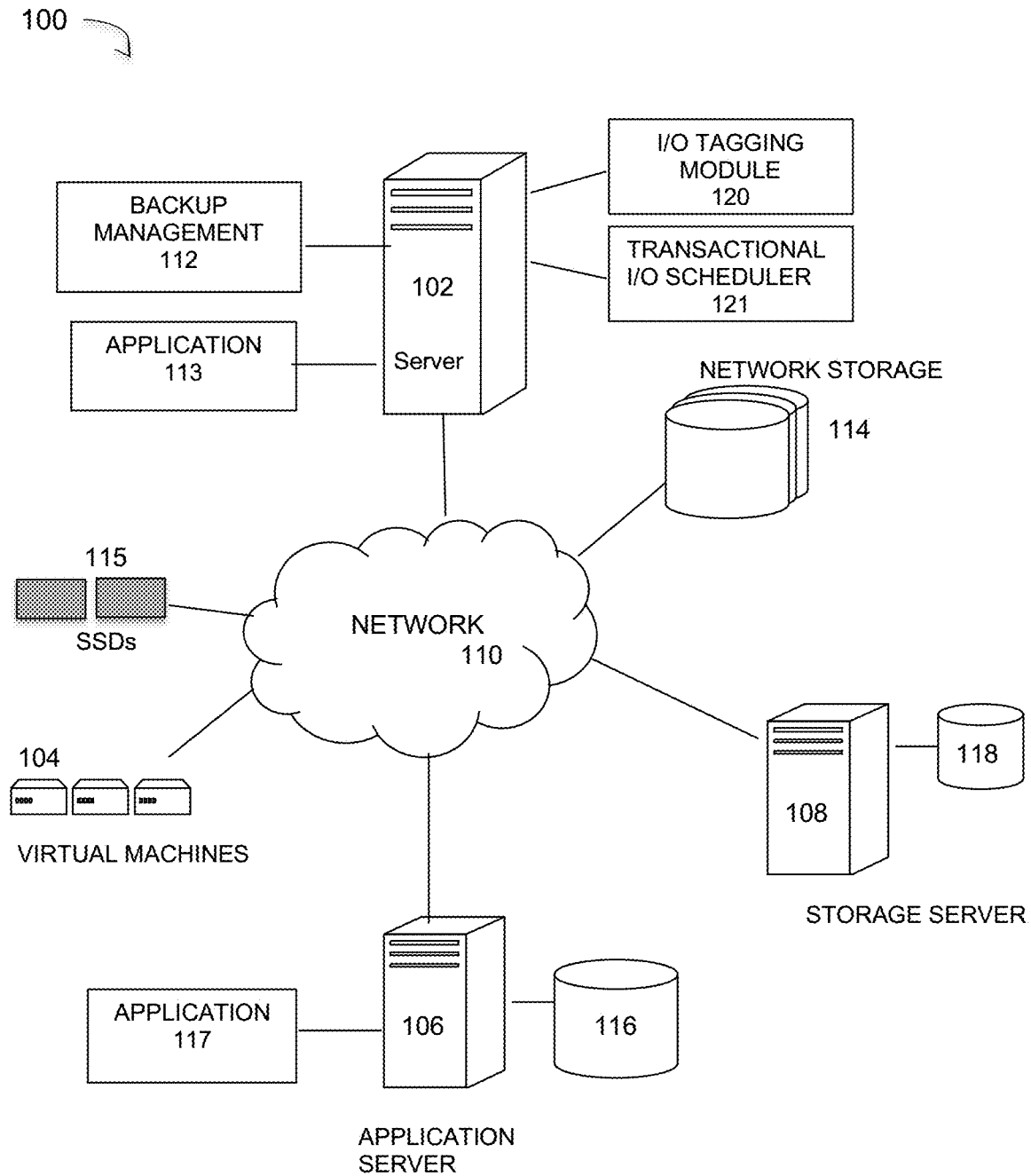
FIG. 1 is a diagram of a large-scale deduplication backup network implementing an I/O tagging module and a transactional I/O scheduler, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments a large-scale deduplication backup network implementing an I/O tagging module and a transactional I/O scheduler. In system 100, a server (e.g., backup server) 102 executes applications 113 including a backup management process 112. If the server 112 is a dedicated backup server, it executes a backup management process 112 to coordinate or manage the backup of data from one or more data sources 108 to storage devices, such as network storage 114, client storage 106, and/or virtual storage devices. With regard to virtual storage, any number of virtual machines (VMs) 104 or groups of VMs may be provided to serve as backup targets. The VMs or other network storage devices serve as target storage devices for data backed up from one or more data sources, such as computer 108, which may have attached local storage 118 or utilize networked accessed storage devices 114.

In an embodiment, the backup management process 112 may be an internal backup application executed locally by server 102 or it may be an external backup application. External applications could be applications such as Oracle database data getting backed or restored from a DDFS system. Internal I/Os may be generated by the DDFS, such as garbage collection activity or file verification activities.

The data sourced by the data source may be any appropriate data, such as database data that is part of a database management system. In this case, the data may reside on one or more hard drives (e.g., 118 or 114) and may be stored in the database in a variety of formats. One example is an Extensible Markup Language (XML) database, which is a data persistence software system that allows data to be stored in XML format. Another example is a relational database management system (RDMS) which uses tables to store the information.

The network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. One or more of the storage devices may also be embodied in solid-state storage devices (SSD) or flash memory that feature fast access times, but are typically more expensive and lower storage capacities than hard disk drives (HDD). For the embodiment of FIG. 1, network storage 114 may be embodied as HDD devices, while separate SSD storage 115 may be provided separately as faster storage media.

In an embodiment, system 100 may represent a Data Domain Restorer (DDR)-based deduplication storage system, and storage server 128 may be implemented as a DDR Deduplication Storage server provided by EMC Corporation, though embodiments are not so limited and other similar backup and storage systems are also possible. In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Data Domain has a logical extension to its file system and MTree organization which allows a data movement policy to be applied to aging backup content. The Data Domain File System (DDFS) which is represented as an active tier and a cloud tier with a policy engine that moves backup data to the cloud tier when it reaches a minimum data age as stipulated in a policy setup dialogue. Metadata is stored on a physical cloud tier within the Data Domain to facilitate ease of file lookup and recall. Once the logical cloud unit is created, Data Domain will place a copy of the metadata stored on the cloud tier into the ECS Bucket via the Cloud Unit.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/ label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

In a Merkle tree, the data chunks directly written to disk are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container. A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$ data.

In a deduplication backup system that uses a cloud tier, such as DDFS, files are moved from the active tier to the cloud tier based on user migration or data movement policy. Such a policy may be based on specific rules dictating when and which files are moved. A typical movement rule may cause file movement based on the age of the files, but other characteristics are also possible. After the files are moved to the cloud, a garbage collection (GC) process cleans the dead space on active-tier. The GC process usually runs as a separate background job to scan all data segments in the file system to find out unreferenced data segments and remove them to release disk space. It also re-packs data into new objects in order to make data objects in similar size, since keeping all objects in as similar a size as possible generally helps performance, and prevents growing metadata due to storing very small objects.

As mentioned above, internal operations like garbage collection are typically throttled or controlled using QoS parameters that are defined to prioritize traffic and resource reservation to provide priority to different applications, processing threads, users, or data flows to guarantee certain levels of performance to data flows. As further mentioned above, QoS implementation is generally limited to single disk performance optimization and does not distinguish between disk types (e.g., SSD versus HDD), thus leading to situations in which QoS agreements are generally not optimally applied to specific backup application I/O processes.

Data Domain is a stream-based backup application. For each stream, there is a RESCLNT_ID mechanism, which is used for the quality of service. This is used to schedule a particular stream for a particular client. The QoS model is based on the RESCLNT_ID to get the schedule, but traditionally this only works at the disk level. There is some round-robin processing of the disks, which themselves can be prioritized, but such prioritization is limited in present systems. Embodiments expand this prioritization mechanism to work up to the HBA level. Embodiments thus apply QoS parameters to the HBA level rather than only at the disk level. Embodiments allow I/O stream scheduling to be performed at the HBA level on top of the disk prioritization level through the I/O tagging module 120 and transactional I/O scheduler.

With respect to the RESCLNT_ID embodiment, in a DDFS system, different file systems operations are assigned with respective RESCLNT_IDs. For example, application read operation, application write operation, garbage collection read operation, garbage collection write operation and so on. These are separated by the RESCLNT_ID so that current QoS models can schedule them separately based on their throttle values. These QoS models generally do not know about the transaction, but rather only know about type of operation.

Figure 2:
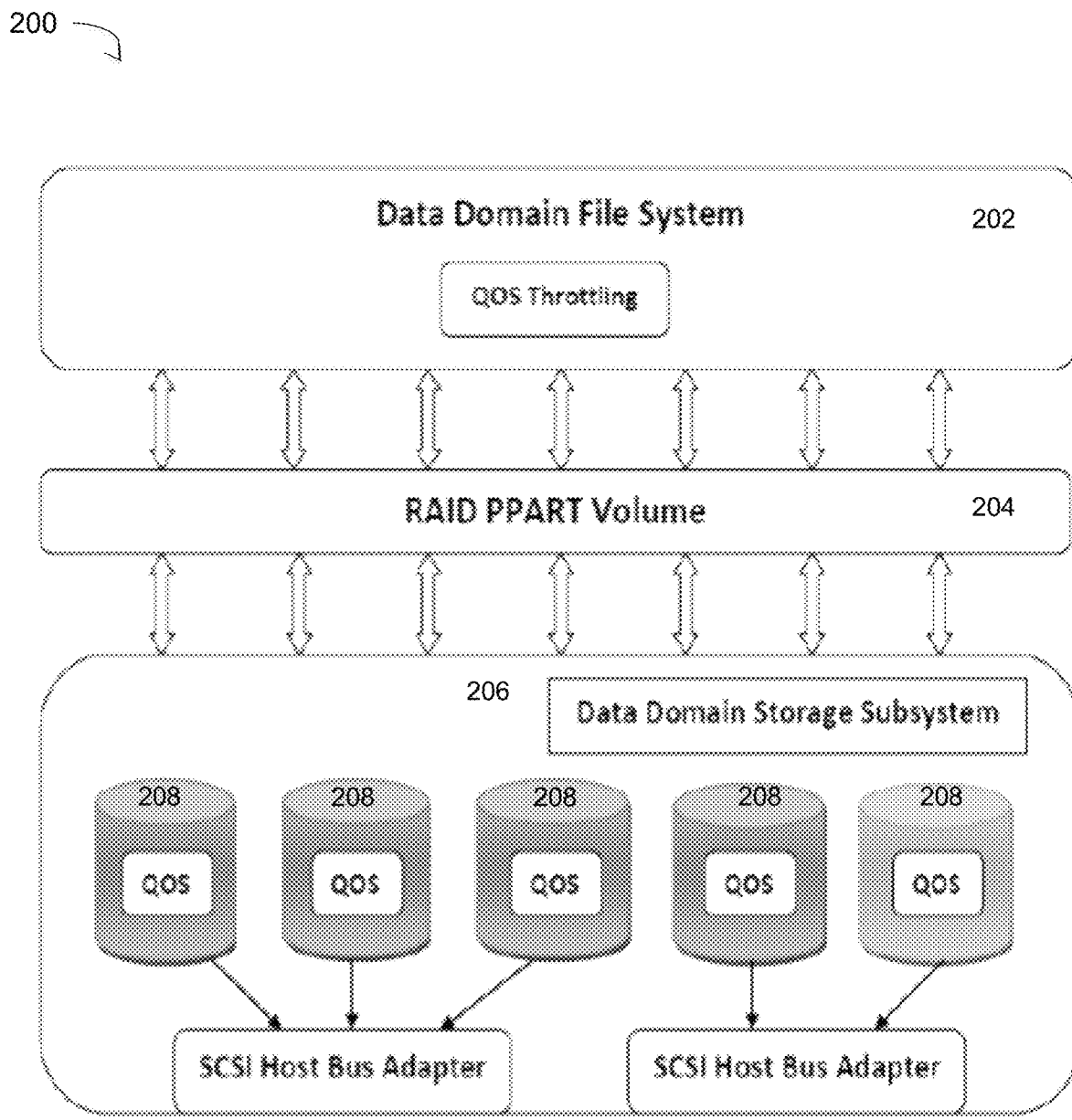
FIG. 2 illustrates a Data Domain system that is used to implement an I/O tagging module and transactional I/O scheduler, under some embodiments.

FIG. 2 illustrates a Data Domain system that is used to implement an I/O tagging module and transactional I/O scheduler, under some embodiments. As shown in FIG. 2, a Data Domain System 200 comprises a Data Domain File System 202 interacting with a RAID subsystem 204 and subsequently to a storage subsystem 206 where each disk 208 has its own Quality of Service module built-in. Each of these disks 208 could be connected to the same Host Bus Adapter (HBA) and would be sharing the bandwidth (SAS/SATA/iSCSI/FC) through which they access the physical device. In this system and with a current Quality of Service architecture, the system will control what I/O will be prioritized at an individual disk level (e.g., a backup application I/O has more priority than internal operations I/O) but once the I/O is dispatched from the disk, it loses the control on which I/O and from which disk would be prioritized by the Host Bus Adapter when it actually sends the I/O down to the physical device.

Figure 3:
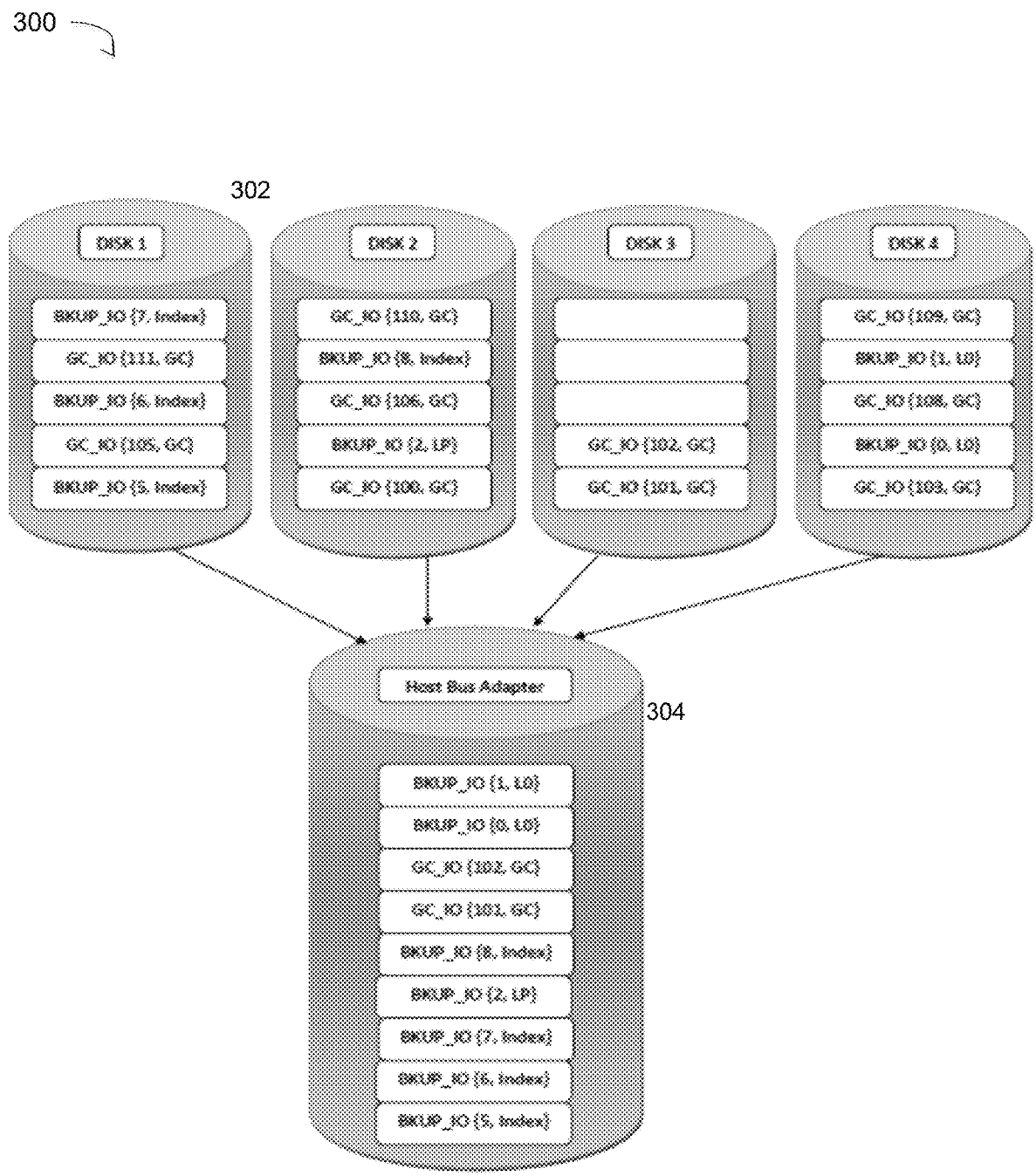
FIG. 3 illustrates an I/O dispatch process for the example system of FIG. 2, under some embodiments.

FIG. 3 illustrates an I/O dispatch process for the example system of FIG. 2, under some embodiments. As shown in diagram 300 of FIG. 3, during the I/O dispatch process, the system performs a round-robin process across the disks 302 (denoted DISK 1 to DISK 4) and picks a few I/Os from each disk and dispatches each down to the HBA 304. During this dispatch, the process lacks certain QoS knowledge, which, if present would help dispatch the I/Os from disks 302 more optimally and service the I/Os faster. For the example of FIG. 3, Disks 1, 2, and 4 have a mix of high priority backup I/Os (BKUP) along with some low priority garbage collection (GC) I/Os, and Disk 3 only has GC I/Os. Using a standard round-robin scheme, the example of FIG. 3 shows that the few I/Os have been dispatched to HBA 304 such that some of the higher priority backup I/Os (BKUP) are interleaved or interrupted by a couple of GC I/Os. For this example, the I/Os from BKUP_IO {0, L0} and BKUP_IO {1, L0} could be dispatched to HBA 304 earlier, which would help complete the backup application process complete more quickly instead of waiting for the GC_IO{102, GC} and GC_IO {101,GC} I/Os. Embodiments include an I/O tagging and scheduling method that provides such prioritization at the HBA level to alleviate this condition.

Figure 4:
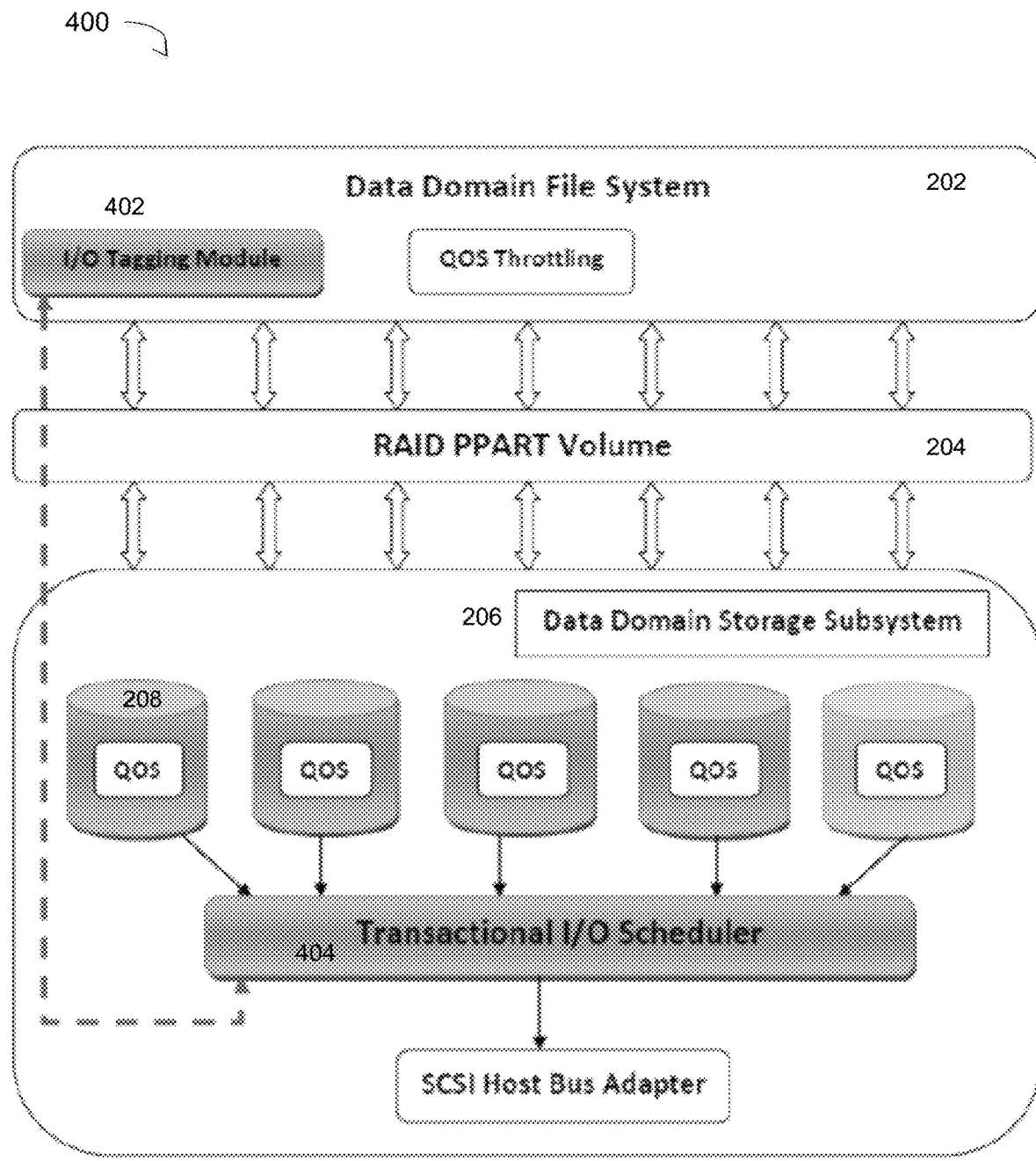
FIG. 4 illustrates the Data Domain system of FIG. 2 implementing an I/O tagging module and transactional I/O scheduler, under some embodiments.

As shown in FIG. 1, embodiments include an I/O tagging component 120 and transaction I/O scheduler 121 to more optimally dispatch the I/O's from the disks to the HBA. FIG. 4 illustrates the Data Domain system of FIG. 2 implementing an I/O tagging module and transactional I/O scheduler, under some embodiments. As shown in Data Domain system 400 if FIG. 4, the DDFS 202 has an I/O tagging module 402, which communicates to a transactional I/O scheduler in the storage subsystem 206. The I/O tagging module 402 tags all child I/Os that are part of the original backup application I/O with a unique tag and to communicates the allocated tags to the peer transactional I/O scheduler module 404 in the Data Domain storage subsystem 206. This module has the knowledge of the I/O tags and all sibling I/Os of the parent backup application I/O from the peer module 402. A transactional I/O scheduler dispatch policy can be set to prioritize dispatch of sibling I/Os of the backup application I/O based on the time of arrival and other Quality of Service policies if defined. In general, the terms child I/Os and sibling I/Os will be considered interchangeable for purposes of the present description.

The I/O tagging module 402 is responsible for tagging all child I/Os (or "sibling I/Os") initiated from the same parent backup application I/O or internal maintenance operation I/O with the same unique tag ID. For a given transaction, (e.g., read operation), tag all siblings of that transaction. One file system read operation from the top and one backup read operation from the child will translate into internal tag. The sibling I/Os are then prioritized to meet the required QoS. For the example of FIG. 3, for Backup I/O BKUP_IO {5, Index}, the "{5, Index}" string comprises the tag, and related to this I/O are sibling I/Os {6, Index}, {7, Index}, and {8, Index}, as an example.

FIG. 5 illustrates example I/O tagging of internal child I/Os, under some embodiments. As shown in table 500 of FIG. 5, example I/Os are separated by I/O type, where there are I/Os from backup applications and garbage collection (GC) applications. Each I/O has an associated Tag ID and arrival time. Each I/O may also have one or more internal child I/Os, as shown in the example. With respect to child I/Os, as an example of reading 1 MB of data, the file system has to locate its metadata first. This involves reading an index I/O first to get a container (block) address. The system then needs to read the container's metadata that involves the I/O. It then has everything it needs to compose I/O requests for that actual data that can translate into multiple I/Os. So, for a given application read operation, the file system must to do multiple I/Os to serve the request. These I/O's can all be tagged as single transaction such that unless all I/Os finish, the system cannot serve the application read request. Such I/Os are considered sibling I/Os.

For implementation purposes, embodiments extend the current RESCLNT_ID mechanism which already exists and add few more bits to uniquely tag the application I/O and all child I/Os that get initiated as part of servicing the main application I/O. The I/O tagging module also tracks the time of arrival of application I/O and how many child I/Os were initiated as part of the backup application I/O or the internal operation I/O, so that it can reuse the tag ID once the entire batch of child I/Os is serviced for a given application I/O.

This tagging module data which can be stored as a hash table indexed by Tag ID is also shared with the transaction I/O scheduler 404 which sits in the Data Domain storage subsystem 206, which helps in efficiently dispatching the sibling I/Os from the same parent backup application I/O.

The transaction I/O scheduler 404 has the knowledge of the I/O tags and all sibling I/Os of the parent backup application I/O or internal operation I/Os from the peer I/O tagging module shared hash table. The transactional I/O scheduler dispatch policy is then set to prioritize dispatch of all sibling I/Os of a backup application I/O based on the time of arrival and other Quality of Service policies if defined. The goal of the transaction I/O scheduler 404 is to service as many transactions as possible, where transaction is processing the collection of all child or sibling I/Os which would complete the backup application I/O or Internal Operation I/O.

Figure 6:
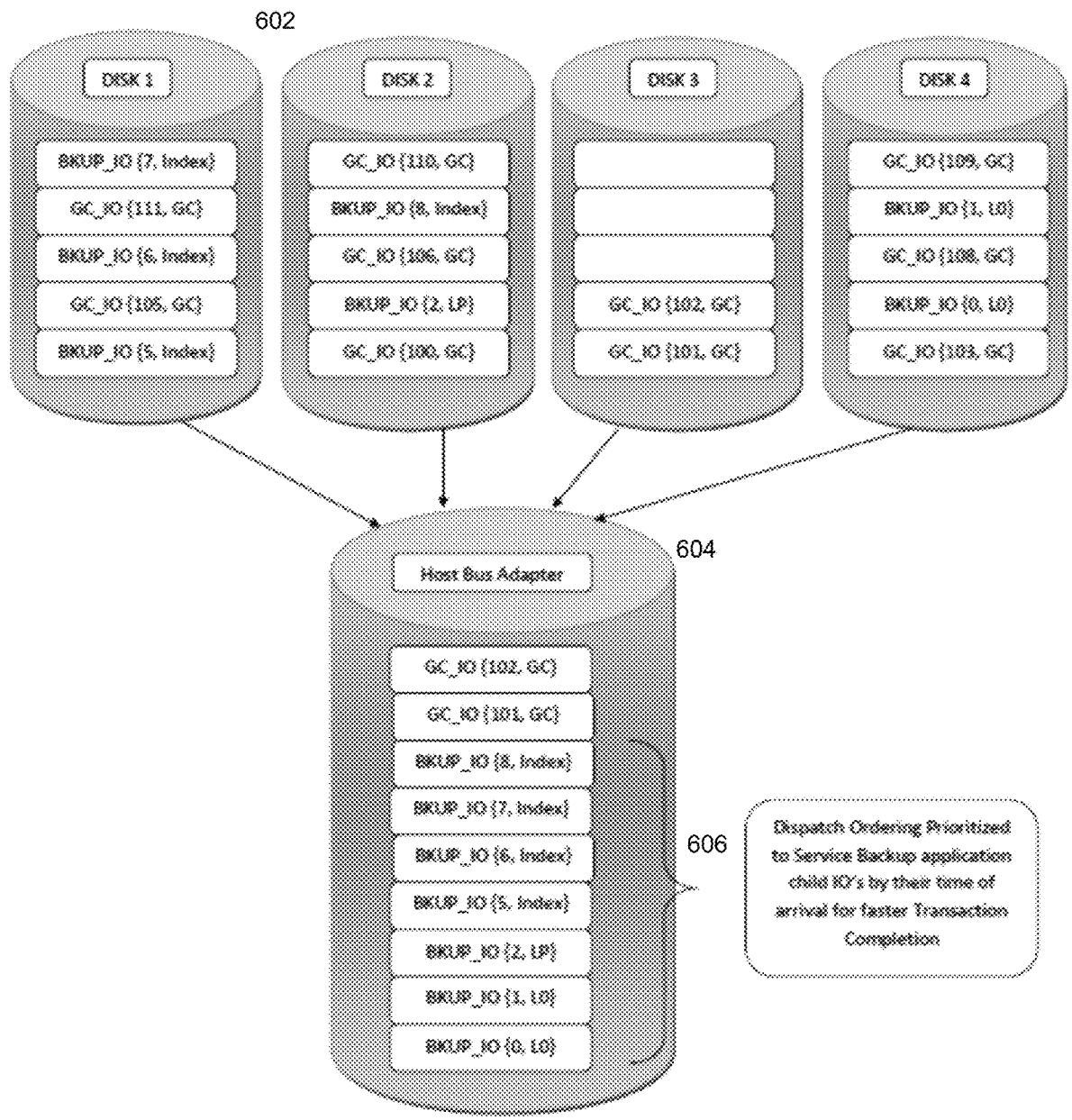
FIG. 6 illustrates an I/O dispatch process for the example system of FIG. 4, under some embodiments.

Following the same example above, with the addition of the transaction I/O scheduler 404, and I/O tagging module 402, the system 400 would dispatch I/Os efficiently such that applications I/O s are serviced optimally. FIG. 6 illustrates an I/O dispatch process for the example system of FIG. 4, under some embodiments. Essentially, FIG. 6 illustrates the I/O dispatch process for the example of FIG. 3 with the dispatch ordering prioritized using an I/O tagging and scheduling method as described above. As shown in diagram 600 of FIG. 6, during the I/O dispatch process, the system performs a round-robin process across the disks 302 (denoted DISK 1 to DISK 4) and also applies certain QoS knowledge through the I/O tagging and scheduling process to prevent interleaving of the BKUP I/Os by the GC I/Os. For this example, unlike that of FIG. 3, the I/Os from BKUP_IO {0, L0} and BKUP_IO {1, L0} are dispatched to HBA 304 earlier than the GC_IO{102, GC} and GC_IO {101,GC} I/Os, thus allowing all of the backup I/Os to be processed before any GC I/Os. As noted by ordering 606, the I/Os are dispatched in a prioritization of the service backup application child I/Os by their time of arrival for faster transaction completion.

With respect to certain internal implementation details of the transaction I/O scheduler 404, this component shares the I/O tagging module hash table. The I/O tagging module hash table maintains the Tag ID, Application I/O arrival time and the number of child I/Os that were initiated as part of the backup application I/O. In the storage subsystem 206, each individual disk would store the I/Os initiated to these disks in a RB-Tree format, where the RB-Tree Node is indexed by the Tag ID assigned by the peer I/O Tagging module and sorted by their time of arrival. Each disk would have multiple RB-Trees; that is, Backup_Application_IO_Tree, Internal_Operations_IO_Tree, and so on, each sorted by the Tag ID. As shown in FIG. 4, the transactional I/O scheduler (Dispatch Module) 404 sits underneath the disks 208 in the Data Domain storage subsystem 206. The dispatch module 404 would refer to the I/O tagging module hash table and will pick an I/O (either a backup application I/O or an internal operation I/O) based on the policy set. The default policy is to prioritize the backup application I/Os over the internal operation I/Os. In this case, if the I/O tagging module hash table consists of any I/Os of type backup operation, the dispatch module would pick the I/O which arrived first in this table. Once the dispatch module identifies an I/O based on the policy, the next step would be to look up individual disks in the storage subsystem for the I/Os with this tag ID. All I/Os for this tag ID would be added to the dispatch queue. Additional optimizations, like starvation avoidance for internal operations I/Os can also be built-in.

Figure 7:
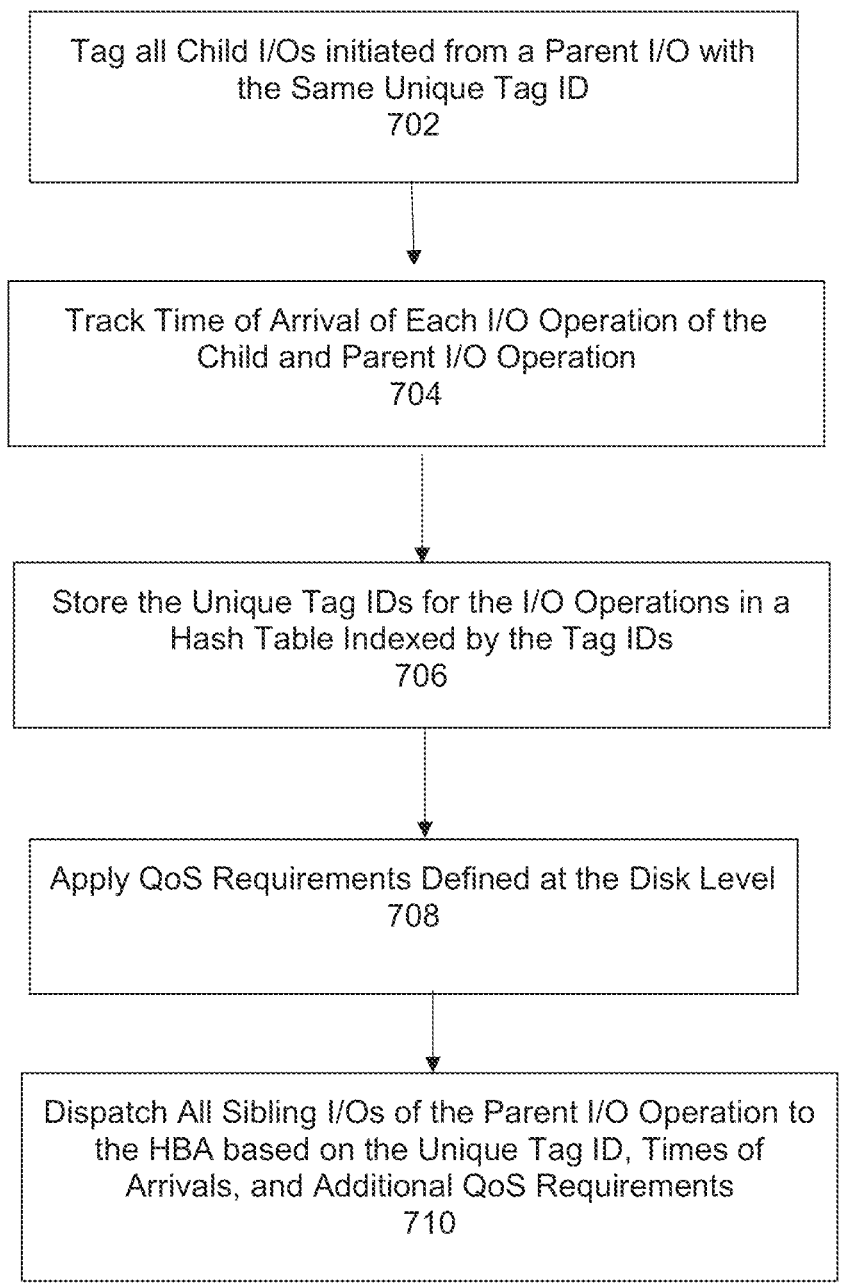
FIG. 7 is a flowchart that illustrates an overall process of achieving storage subsystem performance guarantees using transactional I/O scheduling, under some embodiments.

FIG. 7 is a flowchart that illustrates an overall process of achieving storage subsystem performance guarantees using transactional I/O scheduling, under some embodiments. Process 700 starts by tagging all sibling I/Os initiated from a parent I/O with the same unique tag ID, step 702. The process then tracks the time of arrival of each I/O operation of the child and parent I/O operation, step 704. The I/O tagging module stores the unique tag IDs for the I/O operations in a hash table indexed by the tag IDs, step 706. The storage subsystem applies QoS requirements defined at the disk level to the I/O operations, step 708. From the disks, the transactional I/O scheduler dispatches all the sibling I/Os of the parent I/O operation to the HBA based on the unique tag ID, times of arrivals, and additional QoS requirements defined by the system through the tag IDs, step 710.

Transactional I/O Scheduling for Read/Write/Mixed Workload I/O Operations

Embodiments of FIG. 4 are intended to be used with any general application transaction. However, certain distinctions may be made depending on whether the I/Os comprise read operations or write operations, and whether the I/Os are sequential, random, or internal I/Os.

In an embodiment, the I/O tagging and transactional I/O scheduler can be configured to achieve guaranteed read performance in a storage subsystem appliance. Read operations in DDFS are essentially restore operations, and are thus usually high priority I/Os, since restore operations need to be performed quickly to get a failed network or network node up and running again. Thus, all read operations and all siblings will be prioritized accordingly by tagging them as such. The I/O scheduler then works on the read operation to be sent to the HBA in order of priority.

In another embodiment, the I/O tagging and transactional I/O scheduler can be configured to achieve guaranteed write performance in a storage subsystem appliance. For writes in a DDFS system, the I/Os are generated by streams. Within a DDR appliance, the system applies the solution to the write operation based on the priority of the write operation (e.g., high/medium/low). For every stream, the process first defines the QoS based on this categorization or "class of service". For example, in a set of 1000 streams, some may be high throughput, while others can be low. The defined class of service for each stream is then codified, such as by number (1, 2, 3) or other alphanumeric code. This class of service code is then put in the I/O tagging model to form part of the unique tag ID. FIG. 8 is a table 800 that illustrates an encoding of a tag ID incorporating class of service (Cn) for write I/Os, under some embodiments. In an embodiment, the class of service may be divided into high/low, high/medium/low, or any other appropriate number of levels, which may be encoded as C1, C2, C3, . . . and so on, in order of priority. The class of service is added to the priority and time of arrival to make up a tag ID of each read operation as follows, for the example of FIG. 8: P1_T1_C1, P1_T2_C2, P1_T3_C1, P2_T2_C1, and so on. This tag ID is appended by the I/O tagging module and when sent at the disk level to the transactional I/O scheduler, the I/O operations are dispatched first by order of priority (P1 then P2 then P3, and so on), then by transaction (T1, then T2, then T3, and so on), then by class of service (C1, then C2, then C3, and so on). The I/O scheduler makes sure the I/O operations go through as fast as possible by factoring in the class of service (Cn) encoded in the unique tag ID. At a high level, write operations operate similarly to read operations, as described above. Thus, for any application write operation, there will metadata I/Os and data I/Os. For example, trying to write 1 MB data will be translated into reading metadata (Index, container metadata), writing metadata (Index, container metadata), and then writing the actual data.

In a further embodiment, the I/O tagging and transactional I/O scheduler is configured to achieve guaranteed mixed I/O workload performance in a storage subsystem appliance. For this embodiment, a mixed workload means random, sequential or internal I/Os, which can all be either read or write operations. For this embodiment, the process defines a class of service for each type of workload, and within each class of service, it prioritizes based on P1, P2 priorities and then T1, T2 siblings. The process thus set the priority based on the mixed workload type, i.e., Sequential/Random/Internal, to set the priority and then it prioritizes the transactions and sub-sibling I/Os.

Sequential I/Os are generally produced from backup ingest or restore operations as these are not latency sensitive I/Os, however random I/Os are latency sensitive and should be done quicker. Internal I/O's are file system generated for its own activities, and these can usually be slowed down. Thus, any transaction coming out of random I/O can generally be prioritized over I/Os.

Transactional I/O Scheduling Using Media Properties

In yet another embodiment, the I/O tagging and transactional I/O scheduler is configured to achieve guaranteed read, write, and mixed workload performance using certain media properties in virtual or cloud-based storage systems. The virtual environment can be SSD or HDD, and the cloud can be EDS or S3. For this embodiment, the transactional I/O scheduler is used in combination with media property to achieve guaranteed read and write performance in storage virtual and cloud subsystem where storage is bottleneck, and includes a method to achieve guaranteed application performance using transitional IO scheduler in combination with media property for mixed (Random, Sequential and Internal) workload in storage virtual and cloud subsystem where storage is the bottleneck.

In a virtual system, the disks are not directly exclusively accessed by the Data Domain file system. They can be shared by other applications/processes, and any access to disk goes via the hypervisor (e.g., ESX etc.). In this case the DDFS does not have direct control over the disk, which can result in I/O operations taking longer as compared to appliances. Similarly, for a cloud network, the system reads the media property that are SSDs or HDDs on virtual storage. In both cases, there are given transitions that involve I/O's from HDDs and SSDs or even the cloud network. In such a case, the media properties are considered based on its average latency and when scheduling transaction sibling I/Os. FIG. 9A is a table that illustrates example properties in the form of latency values for three different types of media, SSD, HDD, and Cloud, under some example embodiments. Besides average latency, other latency values can also be used, such as minimum latency, maximum latency, seek times, and other time-dependent properties of the media.

FIG. 9 is a table that illustrates an encoding of a tag ID incorporating media performance parameters, under some embodiments. The transaction scheduler combines I/O's from transaction to dispatch. Assume example I/O operations in FIG. 9B, the system treats that as transaction and adds the additional factor of media property, such as average latency from the media which will help to make better decisions. In FIG. 9B, I/O's from the transaction "Backup_App_Random_I/O_2" are priority so they can be combined, however since it has a cloud I/O in its transaction, it cannot finish in less than 100 ms, even though the random operation is considered to be higher priority. Instead, the process we can combine and prioritize I/Os "Backup_App_Sequential_I/O_1" which is a sequential application I/O that will complete in 20 ms since it has 1 HDD I/O. Basically, here scheduling HDD I/O from Backup_App_Random_I/O_2 would not have benefited the random I/O, but it would have delayed the sequential operation by additional 20 ms. By considering the media property in this case, this is possible.

FIG. 10 is a flowchart that illustrates an overall process of achieving storage subsystem performance guarantees using transactional I/O scheduling with media performance parameters, under some embodiments. Process 950 starts by tagging all child sibling I/Os initiated from a parent I/O with the same unique tag ID, step 952. The process then tracks the time of arrival of each I/O operation of the child and parent I/O operation, step 954. The I/O tagging module stores the unique tag IDs for the I/O operations in a hash table indexed by the tag IDs, step 956. The process also stores the network and device information for virtual and cloud networks, as well as performance parameters for HDD or SDD drives, depending on which media is used for the target storage, step 958. The storage subsystem then applies QoS requirements defined at the disk level to the I/O operations, step 960. From the disks, the transactional I/O scheduler dispatches all the sibling I/Os of the parent I/O operation to the HBA based on the unique tag ID, times of arrivals, network and device characteristics/parameters, and additional QoS requirements defined by the system through the tag IDs, step 962.

Transactional I/O Scheduler for SSD Storage

In an embodiment, the transactional I/O scheduler 121 is configured to operate with SSD network storage 115. When using SSD storage devices within a Data Domain (or similar) appliance, certain sub-caching operations are performed for the main data caching and file system metadata caching processes. The file system metadata caching (MDOF) includes the sub-caches: fingerprint index cache (INDEX), name space cache (DM), segment tree cache (LP and the container metadata cache (CMETA). The data cache includes a cache or sub-cache to cache the frequently accessed segments (Data Cache—L0).

Figure 11:
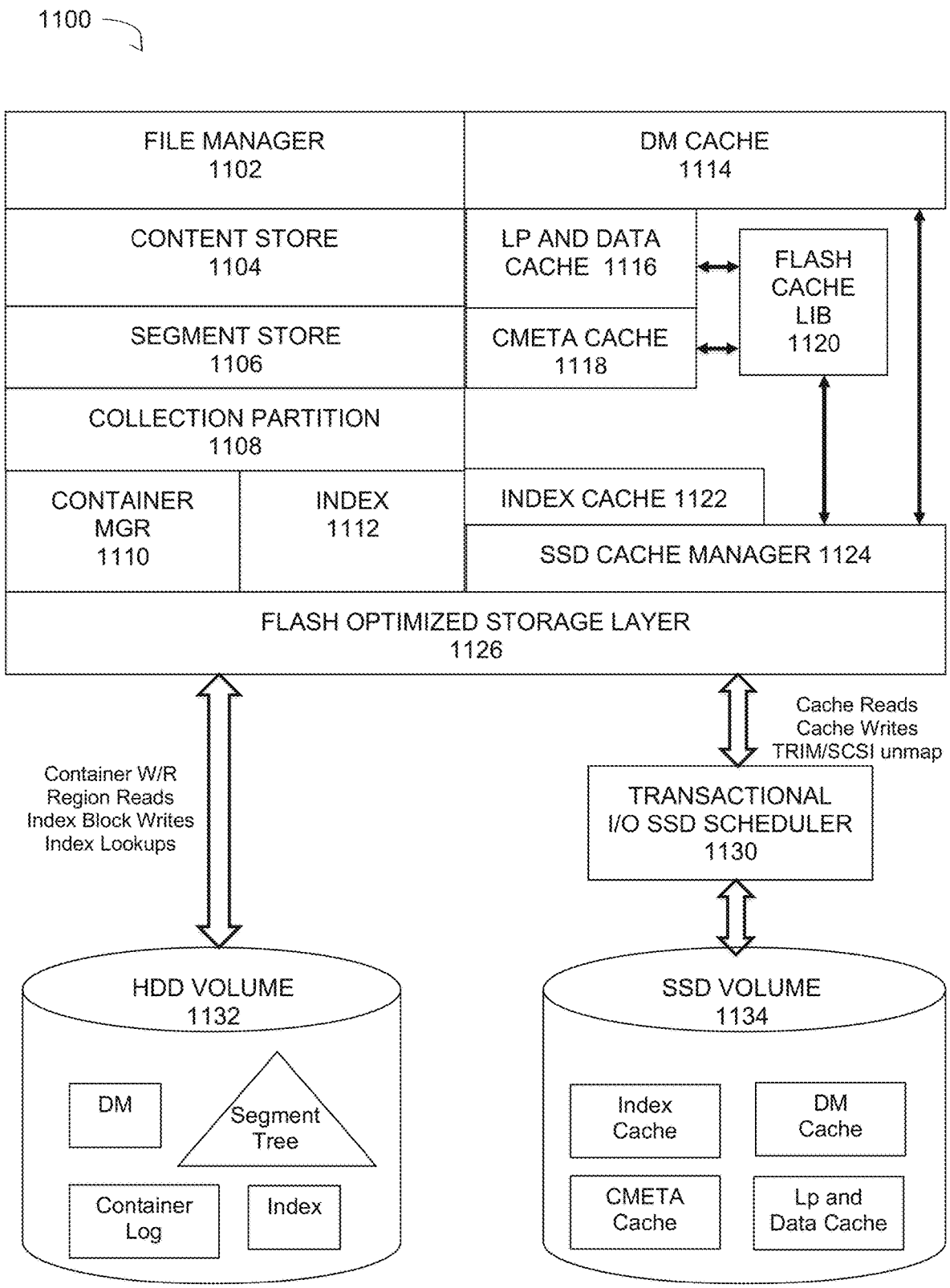
FIG. 11 illustrates a transactional I/O scheduler for use with SSD storage, under some embodiments.

FIG. 11 illustrates a transactional I/O scheduler for use with SSD storage, under some embodiments. System 1100 of FIG. 11 comprises two main storage volumes, HDD volume 1132 and SSD volume 1132. The HDD volume 1132 comprises a name space cache (DM), an Lp segment tree, a container log, and a fingerprint cache index (INDEX). The HDD volume is transacted with by file manager 1102 through container write/read operations, region reads, index block writes, and index lookups. The file manager 1102 interacts with the HDD volume 1132 with other functional components, such as content store 1104, segment store 1106, collection partition 1108, container manager 1110 and index 1112. These upper level components are different cache clients of the file system. Each client uses one or more depending on the type of operation. For example, the DM cache gets used for namespace operations; the Lp and data cache is used for reading file metadata and data segments; the index cache is used for reading fingerprint to container mapping, and CMETA is used for reading container metadata.

The SSD volume 1134 includes an index cache, a name space (DM) cache, a container metadata CMETA) cache, and an Lp and Data cache. A transactional I/O SSD scheduler 1130 controls certain transactions to the SSD volume 1134, such as cache reads, cache writes, and TRIM/SCSI unmap operations. The DM cache 1114 transacts with the SSD volume 1132 through a flash optimized storage layer 1126, and other functional components, such as an SSD cache manager 1124 and index cache 1122. The CMETA cache 1118 and Lp and data cache 1116 interact with a flash cache library 1120 for control by the SSD cache manager 1124. System 1100 illustrates one example of a system configuration for a data domain appliance implementing SSD storage and a flash optimized storage layer, and other configurations and compositions are also possible.

For SSD storage systems, such as system 1100, there could be multiple SSD I/Os generated for a given application I/O request. The system may define different service level agreements (SLAs) for I/Os from different SSD clients. If a lower lover level SLA in terms of latency and TOPS are met for different SSD client's system requests, they will be given guaranteed performance as the file system is tuned for these latencies. In an embodiment, separate queues are created for each client (application) request type. Depending on the configuration requirement for given client type I/O will prioritized accordingly. The application request type may be defined as described above, that is, sequential I/O, random I/O, internal I/O, and so on.

The SSD volume 1134 may comprise different SSD devices, or different SSD devices may be used for different SSD volumes in system 1100. Each SSD storage generally comprises different physical flash or solid state memory devices that may have different configuration and operating parameters and characteristics. In an embodiment, the transactional scheduler is configured to accommodate these different SSD device configurations. FIG. 12 is a table 1200 that illustrates example SSD I/O configurations, under some embodiments. As shown in Table 1200, certain operating parameters are shown for example SSD devices "Model-1" and "Model-2." These include the number of SSD devices, Index read/write latencies, DM read/write latencies, LP read/write latencies, L0 read/write latencies, and CMETA read/write latencies, for different memory capacities. The values in KB/MB are the size of a given I/O operation, and the time (e.g., <10 ms, etc.) is the required latency for that I/O operation in milliseconds. As can be seen in FIG. 12, the latency values can vary quite significantly depending on the SSD model and the type of read/write operation. FIG. 12 is provided for example only, and different configuration parameters and values can be used for different SSD models and devices.

In an embodiment, the configuration information for different SSD devices, such as shown in FIG. 12 is used by the transaction scheduler 1130 to at least partly determine the priority of I/Os to the SSDs. Thus, in combination with the priority transaction scheduler, this configuration information is used to make better decisions as the system knows the required latency for a given I/O to keep the system performing at a guaranteed performance level. The latency properties, such as shown in FIG. 12 may be provided in a configuration file that is defined for or by the system, or it may be provided by the application or a storage manager, such as storage layer 1126.

FIG. 13 is a table 1300 that illustrates example SSD I/Os to be prioritized for dispatch, under some embodiments. In the example of FIG. 13, transaction scheduler 1130 will be combining I/O's from transaction to dispatch. Assume in the example of Table 1300, I/O operations denoted IO_1 and IO_2 each have a number of operations that are as respective transaction. The system adds the additional factor of required latency and IOPS configuration for different cache clients. In this example, I/O's from transaction "Backup_App_Random_IO_2" are a priority, since random I/Os are typically given higher priority than sequential I/Os, as described previously. Thus, these I/O operations can they be combined together. However, since this random IO_2 transaction has SSD_LP_WRITE I/O in its transaction, and a defined SLA of 30 ms (for example), it is acceptable to delay that I/O. Thus, any I/Os belonging to that transaction can be reduced in priority and transaction "Backup_App_Sequential_IO_1" that is a sequential application I/O that has only read I/Os, can be prioritized. This helps to make informed decision rather than purely scheduling I/O's based traditional scheduler. As can be seen in this example, a prioritization based only on one set of defined rules, such as random over sequential may be changed when device characteristics, such as latency requirements are considered. This ultimately improves the overall sequencing of I/Os within the data backup system.

System Implementation

Embodiments of the processes and techniques described above can be implemented on any appropriate backup system operating environment or file system, or network server system. Such embodiments may include other or alternative data structures or definitions as needed or appropriate.

Figure 14:
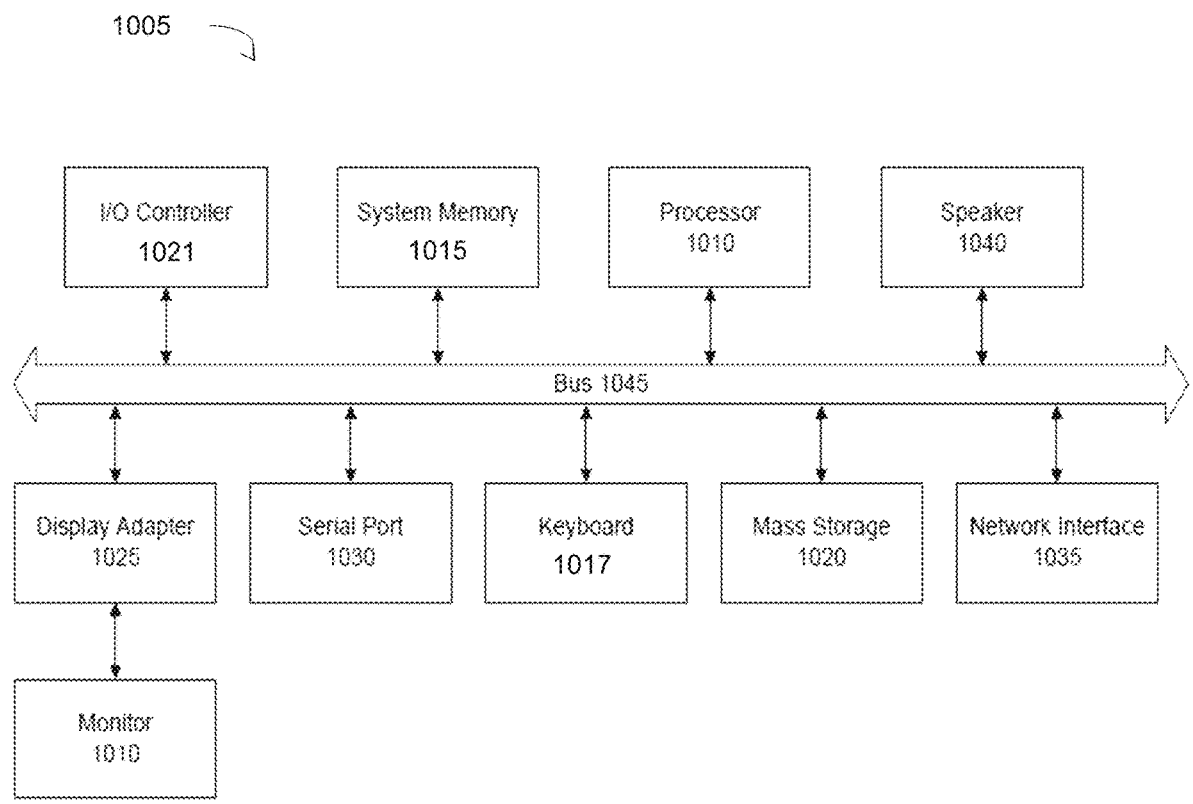
FIG. 14 is a system block diagram of a computer system used to execute one or more software components of the network of FIG. 1, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 14 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system).

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 14 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for prioritizing input/output (I/O) operations dispatched to a solid-state device (SSD) storage in a network, comprising:
    maintaining a plurality of caches in the SSD storage;
    determining properties of the SSD storage including performance parameters;
    storing the performance parameters of the SSD storage with performance parameters for other storage types including hard disk drive (HDD) devices;
    receiving a plurality of SSD I/Os from an application I/O request comprising at least one of a cache read or a cache write operation, and wherein each I/O comprises one or more child I/Os as part of a backup operation;
    tagging the I/Os from a same backup operation such that all child I/O operations initiated from a parent I/O operation are tagged with a same unique tag ID to establish child and sibling I/O processing relationships, and wherein one file system read operation from the parent and one backup read operation from the child produces an internal tag corresponding to the tag ID;
    creating a respective queue for each SSD I/O of the SSD I/Os based on a type of SSD I/O;
    prioritizing the each SSD I/O based on the type of the SSD I/O and the properties of the SSD storage that is the target for a respective SSD I/O, and based on the performance parameters of the SSD storage relative to the other storage types; and
    dispatching, in a transactional I/O SSD scheduler, all queued SSD I/Os to the SSD storage based on the prioritizing and the tagging of child and sibling I/Os to meet defined quality of service (QoS) requirements through the performance parameters of the SSD storage, wherein I/Os tagged with the same unique tag ID are processed as a single transaction such that unless all the same tagged I/Os finish, a read request cannot be serviced.

2. The method of claim 1 further comprising:
    tracking a time of arrival of each I/O operation of the I/O operations; and
    dispatching, in a transactional I/O scheduler, all sibling I/Os of the parent I/O operation based on a unique tag ID for the sibling I/Os, a respective time of arrival of each of the sibling I/Os, and defined quality of service (QoS) requirements.

3. The method of claim 2 wherein the plurality of caches comprise a fingerprint index cache, a name space cache, a segment tree cache, and a container metadata cache, and further wherein the properties of the SSD storage comprise at least latencies of the read and write times for the caches in the SSD storage.

4. The method of claim 3 wherein the latencies are defined for read and write operations for each cache of the plurality of caches, and further wherein the latencies are further defined for a size of the read and write operation, and a maximum time of access of a respective cache of the plurality of caches.

5. The method of claim 2 further comprising storing tag data from the tagging step in a hash table indexed by respective tag IDs and that is shared with the transactional I/O scheduler that is configured to service as many transactions as possible by processing collected child I/Os as single transactions to complete the backup operation.

6. The method of claim 1 wherein the type of the SSD I/O comprises one of sequential I/O operations, random I/O operations, and internal I/O operations, and further wherein the backup operation is for a stream-based deduplicated backup process processing file represented in a Merkel tree structure comprising a plurality of hierarchical data segments.

7. The method of claim 6 further comprising accounting for a guaranteed service level agreement (SLA) response time of the application I/O request during the prioritizing step.

8. The method of claim 7 further comprising defining a first priority by prioritizing random I/O operations over sequential I/O operations and internal I/O operations.

9. The method of claim 8 further comprising modifying the first priority by determining if a latency requirement of a higher priority I/O operation is required to meet the guaranteed SLA, and if not, allowing a lower priority I/O operation to proceed in advance.

10. The method of claim 9 further comprising, prior to the dispatching step, applying local SLA requirements defined by each device of the SSD storage to the I/O operations to further modify the first priority.

11. A system for prioritizing input/output (I/O) operations dispatched to a solid-state device (SSD) storage in a network, comprising:
    a plurality of caches maintained in the SSD storage;
    an SSD cache manager managing the plurality of caches in the SSD storage, and
    a transactional I/O SSD scheduler functionally coupled between the SSD cache manager and the SSD storage, and configured to: determine properties of the SSD storage including performance parameters, store the performance parameters of the SSD storage with performance parameters for other storage types including hard disk drive (HDD) devices, receive a plurality of SSD I/Os from an application I/O request comprising at least one of a cache read or a cache write operation, wherein each I/O comprises one or more child I/Os as part of a backup operation, tag the I/Os from a same backup operation such that all child I/O operations initiated from a parent I/O operation are tagged with a same unique tag ID to establish child and sibling I/O processing relationships, and wherein one file system read operation from the parent and one backup read operation from the child produces an internal tag corresponding to the tag ID, create a respective queue for each SSD I/O of the SSD I/Os based on a type of SSD I/O, prioritize the each SSD I/O based on the type of the SSD I/O and the properties of the SSD storage that is the target for a respective SSD I/O and based on the performance parameters of the SSD storage relative to the other storage types, and dispatch all queued SSD I/Os to the SSD storage based on the prioritizing and the tagging of child and sibling I/Os to meet defined quality of service (QoS) requirements through the performance parameters of the SSD storage, wherein I/Os tagged with the same unique tag ID are processed as a single transaction such that unless all the same tagged I/Os finish, a read request cannot be serviced.

12. The system of claim 11 wherein the plurality of caches comprise a fingerprint index cache, a name space cache, a segment tree cache, and a container metadata cache, and further wherein the properties of the SSD storage comprise at least latencies of the read and write times for the caches in the SSD storage.

13. The system of claim 12 further comprising a hash table storing tag data from the transactional I/O scheduler in a hash table indexed by respective tag IDs, wherein the transactional I/O scheduler that is configured to service as many transactions as possible by processing collected child I/Os as single transactions to complete the backup operation.

14. The system of claim 11 wherein the latencies are defined for read and write operations for each cache of the plurality of caches, and further wherein the latencies are further defined for a size of the read and write operation, and a maximum time of access of a respective cache of the plurality of caches.

15. The system of claim 11 wherein the type of the SSD I/O comprises one of sequential I/O operations, random I/O operations, and internal I/O operations, and further wherein the backup operation is for a stream-based deduplicated backup process processing file represented in a Merkel tree structure comprising a plurality of hierarchical data segments.

16. The system of claim 15 wherein the transactional SSD I/O scheduler further accounts for a guaranteed service level agreement (SLA) response time of the application I/O request during the prioritizing step.

17. The system of claim 16 wherein the transaction SSD I/O scheduler further defines a first priority by prioritizing random I/O operations over sequential I/O operations and internal I/O operations, and modifies the first priority by determining if a latency requirement of a higher priority I/O operation is required to meet the guaranteed SLA, and if not, allowing a lower priority I/O operation to proceed in advance.

18. The system of claim 17 wherein the transaction SSD I/O scheduler further applies local SLA requirements defined by each device of the SSD storage to the I/O operations to further modify the first priority.

19. The system of claim 11 wherein the system comprises a deduplication backup system storing data to storage media including the SSD media.

20. A non-transitory computer media product containing programming code which, when executed by a processor in a computer system, cause the computer system to perform method for prioritizing input/output (I/O) operations dispatched from a solid-state device (SSD) storage to a host bus adapter in a network, comprising:
    maintaining a plurality of caches in the SSD storage;
    determining properties of the SSD storage including performance parameters;
    storing the performance parameters of the SSD storage with performance parameters for other storage types including hard disk drive (HDD) devices;
    receiving a plurality of SSD I/Os from an application I/O request comprising at least one of a cache read or a cache write operation, and wherein each I/O comprises one or more child I/Os as part of a backup operation;
    tagging the I/Os from a same backup operation such that all child I/O operations initiated from a parent I/O operation are tagged with a same unique tag ID to establish child and sibling I/O processing relationships, and wherein one file system read operation from the parent and one backup read operation from the child produces an internal tag corresponding to the tag ID;
    creating a respective queue for each SSD I/O of the SSD I/Os based on a type of SSD I/O;
    prioritizing the each SSD I/O based on the type of the SSD I/O and the properties of the SSD storage that is the target for a respective SSD I/O, and based on the performance parameters of the SSD storage relative to the other storage types; and
    dispatching, in a transactional I/O SSD scheduler, all queued SSD I/Os to the SSD storage based on the prioritizing and the tagging of child and sibling I/Os to meet defined quality of service (QoS) requirements through the performance parameters of the SSD storage, wherein I/Os tagged with the same unique tag ID are processed as a single transaction such that unless all the same tagged I/Os finish, a read request cannot be serviced.

* * * * *